Nov. 16, 1943.    F. H. BATEMAN ET AL    2,334,598
MEANS FOR PLANTING
Filed Jan. 15, 1940    6 Sheets-Sheet 2

INVENTORS
Frederic H. Bateman
Isaac Trolley

BY Walter W. Burns
ATTORNEY.

Patented Nov. 16, 1943

2,334,598

UNITED STATES PATENT OFFICE 2,334,598

MEANS FOR PLANTING

Frederic H. Bateman, Grenloch, N. J., and Isaac Trolley, York, Pa., assignors, by mesne assignments, to Fred H. Bateman, Grenloch, N. J., and Camden Trust Company, a corporation of New Jersey, trustees under the will of Ellen M. Bateman, deceased Application January 15, 1940, Serial No. 313,990

26 Claims. (Cl. 111—7)

This invention relates to planting machines and has particular relation to machines wherein the planting and deposit of fertilizer are carried on in the same operation.

In planting of plants, difficulty has been experienced in preparing the soil so that the plant will be given proper, immediate and continuous nourishment from and after its planting, without the wastage of or deposit of too much fertilizer.

The primary object of the invention is the provision of an improved planting machine, such as a transplanter.

Another object of the invention is the provision of an improved transplanting machine wherein a water supply which may carry fertilizer in solution and a dry fertilizer supply is provided for the plant.

A further object of the invention is the provision of an improved transplanting machine wherein a single control means is provided to coordinate the deposit of the water and interrupted bands of fertilizer and also the movement of the transplanter gauge.

A still further object of the invention is the provision of an improved transplanting machine wherein a single means controls the movement of the transplanting gauge and the deposit of the water and dry fertilizer in units.

Another and still further object of the invention is the provision of an improved transplanting machine wherein the transplanting gauge and the means for depositing the water and fertilizer and the means for covering the plant roots are all made to function in one operation.

Still another and further object of the invention is the provision of an improved machine wherein a water supply is placed in the ground as the planting takes place, the amount of the water being adjustable at the will of the operator.

Still another and further object of the invention is the provision of an improved machine having an automatically controlled intermittent water supply with manually controlled means for shutting off the water supply at the will of the operator.

Still another object of the invention is the provision of a process for placement of dry fertilizer and water in proper relation to the planting, the water being with or without fertilizer in solution or suspension, the dry fertilizer being placed between proper near and distant limits to prevent wastage of the fertilizer while still having it available to the planting during its early stages in the soil.

Still another object of the invention is the provision of a transplanter having a leveler between the fertilizer depositing means and the planting mechanism to provide a smooth surface for the planting.

Still another object of the invention is the provision of a transplanter having a bedding attachment to form a ridge or ridges.

Still another object of the invention is the provision of an improved non-conical and non-cylindrical presser wheel which may be corrugated and which will break up the lumps of soil, thus facilitating the pressing operation and forming small furrows or pockets in which rain water may collect until absorbed by the soil.

Other and further objects of the invention will be apparent to those skilled in the art from a reading of the complete specification and claims.

Referring to the drawings wherein is illustrated an embodiment of the invention:

Fig. 2 is a perspective view of some of the operating parts of the invention.

Fig. 3 is a view similar to Fig. 2 but from a different angle.

Figs. 6 to 10, inclusive, are views showing details of the structure.

The invention will now be described in detail in connection with a transplanting machine.

Similar reference characters refer to the same or similar parts throughout the specification and drawings.

A main frame 10 is provided with wheels 11. The wheels 11 are carried by a shaft 11$^a$ to which they are connected by suitable ratchets (not shown) in the well known manner. Above the frame and supported thereby is a fertilizer box or hopper 12 having one or more compartments for supplying a complete fertilizer or one or more different kinds of fertilizer including lime or for supplying separated or groups of component parts of the desired fertilizer. Also supported on the frame 10 is a tank 13 for carrying water. The water carried in the tank may or may not carry fertilizer material either in solution or in suspension.

Beneath the main frame 10 is a transplanter frame 14 which is pivoted at its forward end as at 15 to a forward frame 16. The forward frame 16 carries a fertilizer depositing mechanism at its forward end. Boots 17 are located at the rear of the respective disks 18 and have their lower ends in positions to deposit the fertilizer where needed. To prevent the fertilizer from being deposited except when it is desired, pivoted gates 19 are provided. Connected to the gates 19 are bell crank levers 20 which are operated by operating rods 21 which are normally spring-held as by the springs 21ª in positions to keep the gates closed except when positively opened to discharge the fertilizer. The upper ends of the rods 21 are secured to arms 22 of the bell crank 23. An arm 24 is secured to one end of the bell crank 23 and is operated by a cam arm 25 secured to a rotating cam shaft 26. The cam arm 25 carries a tappet roller 25ª which provides the contact means for moving the arm 24. On the end of the shaft 26 opposite the cam arm 25 is a sprocket 27 which is connected by a suitable chain 27ª to the sprocket 28ª on the shaft 28. A smaller sprocket 28ᵇ is also mounted on the shaft 28 and is driven by a chain connected to a large sprocket S mounted to turn with the axle 11ª with the forward movement of the machine.

Extending up from and mounted on the shaft 26 are two links 29 connected together by a cross brace 29ª which holds the links 29 in position relative to each other. The links 29 are pivoted at their upper ends to a two-arm frame 30, the pivot means herein illustrated as being the shaft 28, already described.

The rear end of the two-arm frame 30 is supported freely on the axle 11ª and with the links 29, forms a support for the power transmitting means connecting the axle 11ª with the cam shaft 26.

Figure 16:
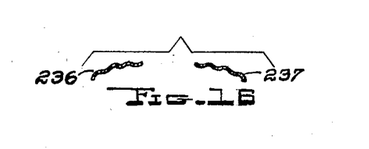
Fig. 16 is a fragmental sectional view on the line 16—16 of Fig. 15.

The rear ends of the forward frame 16 are pivoted to the main frame as at 35. The transplanter frame which is pivoted at its forward end, at 15, extends rearwardly and carries at its rear, a pair of presser wheels 36 which are pivoted at 37 and are normally kept in a relatively lowered position through coaction between the arm of the presser frame 38ª, pivoted at 38ᵇ to the wheel supporting frame 38 and the spring 39 which has one end rigid with the frame 14. In place of the presser wheels, there may be provided press plates 236, 237, preferably of brass. These may be provided with corrugations which preferably grow deeper from front to rear. These corrugations serve to place ridges in the surface of the soil and form collecting walls to prevent erosion of the soil. They make in effect small ditches to collect and hold rain water until it is absorbed. This construction is illustrated on Figs. 15 and 16.

The invention which provides for the placing of the dry fertilizer, preferably in interrupted bands, in proper relation to the deposit of the water, is provided with planting interval means which can be controlled simultaneously with the coacting means to vary the interval between the plantings and at the will of the operator.

The forward portion of the forward frame 16 carries a pair of brackets 40 which between them at their rear ends carry a square rod 41. Situated between a pair of stop members as the cotter pins 42, and surrounding the square rod 41 is a cam slide 43. A socket at its rear end receives the forward end of the operating rod 44 of the transplanter gauge mechanism. Near the rear end of the rod 44 is a guide 45 which is mounted on the frame 14 and confines the movement of the plant gauge rod 44 to a forward and back straight line movement. On the rear end of the gauge operating rod 44 is located the transplanting gauge 46.

The ground opening or plow member 47 is suitably secured to the frame 14 and is in position to have the gauge operate in its path and between the bands of fertilizer already deposited. The size, style and shape of the plow member 47 will vary in accordance with the plant to be transplanted.

On the shaft 26 between the links 29 are arms 47ª carrying tappet rollers 48. These tappet rollers 48 alternately engage first the end and then the top surface of the cam slide 43. The length of the arms 47ª and the diameter of the tappet rollers 48 and the position and shape of the cam face of the cam slide 43 are so relatively proportioned and arranged that the movement of the gauge 46 will guide the operative in placing the plant. As the gauge is in its forward position, the plant in the operative's hand is placed against the gauge. Rearward movement of the gauge by the coaction of the cam slide 43 with the tappet roller 48 pushes the plant rearwardly relative to the forward movement of the machine at which time it is released. The presser wheels 36 following, cover the roots of the planting.

One of the important features of the invention is the provision of means for transplanting and for supplying water with or without fertilizer dissolved or suspended therein and in measured amounts, and in the same operation, the deposit of dry fertilizer units.

In carrying out this part of the invention, there is provided a pair of relatively adjustable rods 50 and 50ª, the latter being pivoted at its forward end to the cam head 50ᵈ as at 50ᵉ. The rear end 50ᵇ of the rod 50 slidably operates in a bracket guide 51 and has an upwardly offset portion 50ᶜ which rests upon a suitable surface as a roller in the guide 51. The rear end 50ᵇ engages a roller 52ª on the end of a lever 52 (see Figs. 3, 5 and 8) which is pivotally connected at its forward end to the frame and is pivotally connected intermediate its ends to the link 53ª which operates the valve of the water connection 53. This connection 53 is connected to the water tank 13 by a suitable connection as a hose. As the rear end 50ᵇ is caused to rise by the offset portion 50ᶜ riding upwardly in the guide 51, the link 53ª is lifted and the water is discharged in the rear of the plow 47. It will be clear that during the complete cycle of operation, the longer the water valve is open, the more water will be discharged. In order to vary the amount of water according to the ground conditions, the offset portion 50ᶜ may be adjusted forwardly or rearwardly relative to the forward operating end of the operating rod 50ª. The rearward end of the operating rod 50ª is secured to an adjustable block 54 which receives the operating rod 50 and may be secured in any desired adjusted position by a suitable set screw 54ª. The forward end of the rod 50 is slidably mounted in an opening in the cam head 50ᵈ. The rod 50ᵃ is pivotally secured to the cam head 50ᵈ at 50ᵉ as already described and is secured by the set screws 54ᵃ relative to the rod 50. By adjusting the block 54 forward relatively to and along the rod 50, the greater will be the length of time during which the water valve will be open.

Mounted on the shaft 26 in line with the cam head 50ᵈ are tappet arms 56 carrying tappet rollers 55. The rollers 55 are in position to engage the end of the cam head 50ᵈ to push the same rearwardly, the releasing action taking place as the tappet roller 55 clears the upper edge of the end face of the cam head 50ᵈ. This cam head 50ᵈ has a slot, the upper and lower sides of which engage the square rod 41. The rod 41 is provided with suitable means for preventing movement of the cam head 50ᵈ axially along the square rod 41, such as the cotter pins 42.

Pivoted to the forward frame about midway of its length at 57 are a pair of hangers 58 secured to the floating leveller 59 which smooths the surface of the ground after the fertilizer has been deposited.

In operation, the cam members and the arm 24 are so arranged each relative to the position of its tappet roller and the latter so located with relation to each other about the shaft 26 that the fertilizer will be deposited in units which are preferably of the broken band type and so spaced that when the transplanting gauge holds the plant relatively substantially stationary in the soil, the dry fertilizer will be in its place—preferably on the sides midway between the bottom of the roots and the crowns of the plants while the water with or without dissolved or suspended fertilizer will also be deposited for the performance of its functions. However, when it is desired to have a continuous band, a suitably shaped notched block can be placed under the upper end of the lever 22 and the gate valve 19 will remain open.

In some instances, it may be desired that on one side of the line of plantings, a continuous band of fertilizer shall be deposited and on the other side an interrupted band shall be deposited. If this is desired, one of the trip rods 21 is disconnected from its lever arm 22 and held in raised position by any suitable means as a block. This will cause the corresponding gate 19 to remain continuously open with the result that there will be a continuous band of fertilizer deposited. This will not interfere with the operation of the other trip rod 21 to cause placement of an interrupted band. The trip rod 21 will continue to be operated by the tappet rollers 25ᵃ, the arm 24 and its lever arm 22.

Figures 13, 15:
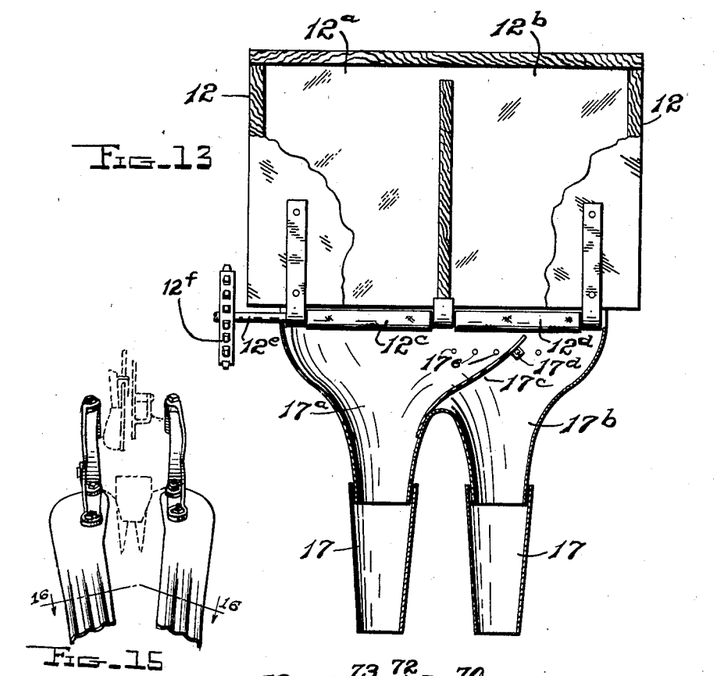
Fig. 13 is a fragmental sectional view illustrating the divided hopper for the dry fertilizer or lime.
Fig. 15 is a perspective view of the improved press plates having corrugated surfaces.

In the use of this invention, it has been found to be desirable, in some instances, to use a divided fertilizer box or hopper 12 having separate compartments as 12ᵃ and 12ᵇ. At the bottom of these hopper compartments are the usual feed mechanisms as the well-known endless carriers 12ᶜ and 12ᵈ. These are operated by the shaft 12ᵉ which is turned by the sprocket 12ᶠ. By having separate compartments 12ᵃ and 12ᵇ, portions of the component parts of the fertilizer may be placed in one compartment and another component part or parts, with or without lime may be placed in the other. For example, the double or two-compartment hopper makes it possible to place the superphosphate or superphosphate and lime, mixed together, close to the seed or plant since neither superphosphate nor lime is injurious to the root or seed. At the same time, the other hopper may supply the nitrogen and potash components which may be placed farther away where they can do no injury to the plants. And while these component parts of the fertilizer when so deposited are separated from each other, they are still all available for the promotion of the growth and development of the plant.

In some instances, where the same fertilizer is used in both hoppers, it may be found to be desirable to deposit a portion of the fertilizer from one compartment as 12ᵇ over to the other side. For example, it may be desired that half of the delivery from the compartment 12ᵇ shall be placed in the chute 17ᵃ along with all of that delivered from the compartment 12ᵃ, the remaining half from the compartment 12ᵇ being still delivered through the chute 17ᵇ to the boot 17 and deposited as already described. By securing the deflecting vane 17ᶜ by the screw 17ᵈ to any one of the holes 17ᵉ, various proportions of the fertilizer falling from the endless belt 12ᵈ will fall into the chutes 17ᵃ and 17ᵇ.

To normally hold the planter gauge operating rod 44 in its forward position, we provide a coil spring 55 which is connected at its rearward end to the rod 44 and its forward end to the frame. A similar spring 55ᵃ is attached at one end to the frame and at its other end to the operating rod 50.

As an attachment, we provide a bedding means for raising the height of the ground where the planting is placed. In the illustrated embodiment, we have placed the bedding attachment between the fertilizer depositing means and the transplanter gauge.

Figure 14:
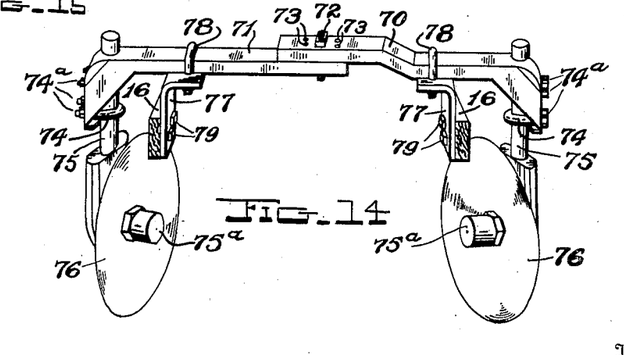
Fig. 14 is a front view of the bedding attachment showing fragments of the forward frame to which it is attached.

The bedding attachment comprises two relatively adjustable bars 70 and 71 which are secured together by bolts 72 which by adjustment in the holes 73 may vary the distance between the outer ends of the bars 70 and 71. The outer ends of the bars 70 and 71 are turned downwardly and are provided with openings for U-bolts 74 which pass around the respective spindles 75 of the disk wheels 76. At the lower ends of the spindles 75 are right angular bearings 75ᵃ upon which the disk wheels rotate. The spindles 75 pass through openings in the ends of the respective bars 70 and 71. The spindles 75 being cylindrical, by loosening the nuts 74ᵃ on the U-bolts 74, the spindles 75 and the disks 76 may be adjusted in a horizontal plane about the axis of the spindle 75 and in a vertical direction through the U-bolts 74 and the opening in the bars 70 and 71.

Figure 1:
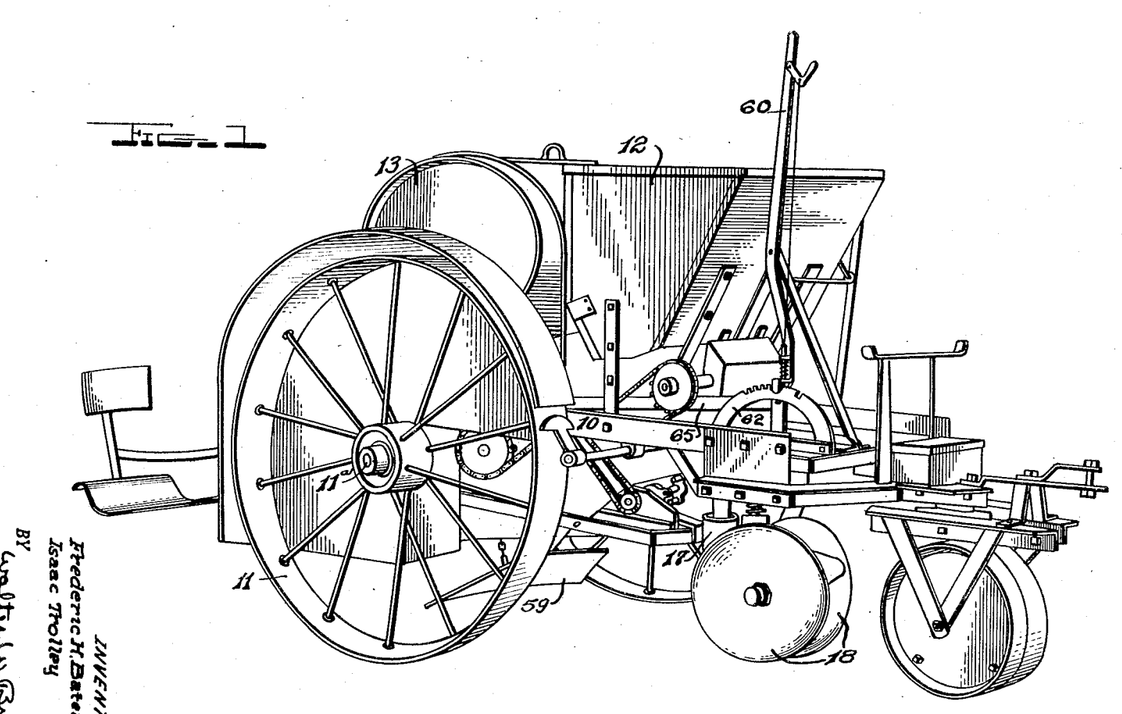
Fig. 1 is a side perspective view of the machine as a whole.
Figures 2, 5, 6:
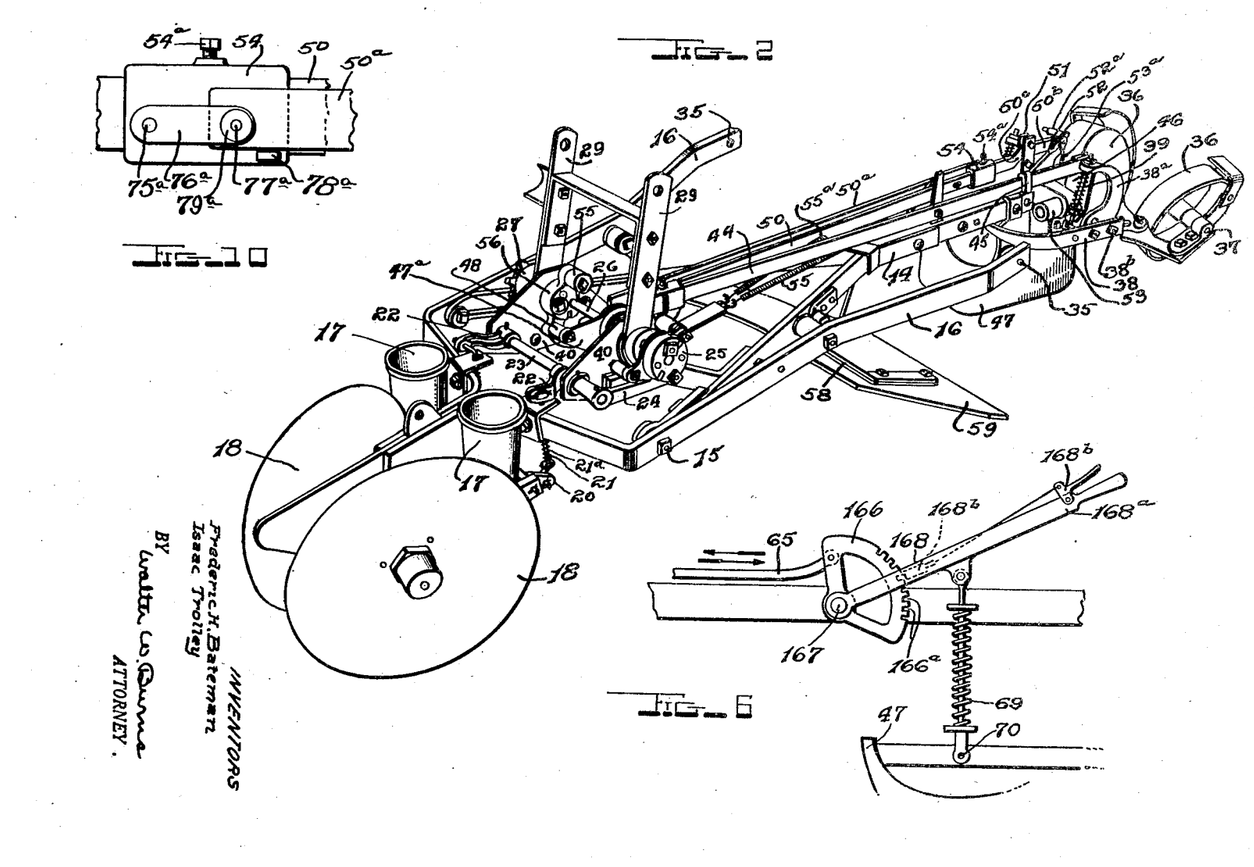
Figures 3, 5, 7, 8:
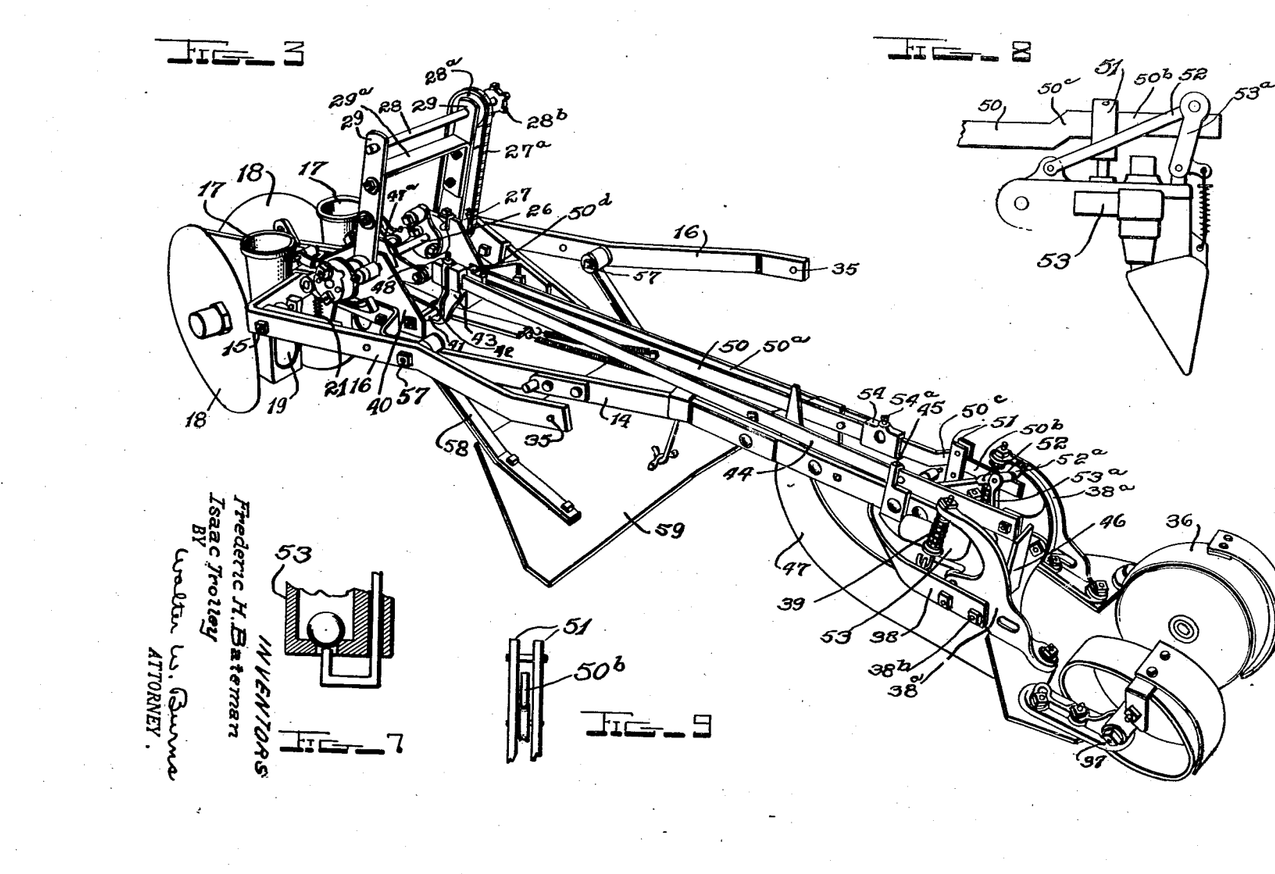

Intermediate the ends of the respective bars 70 and 71 are secured the connecting angle-brackets 77 which are held in place by the U-bolts 78. The lower ends of the angle-brackets 77 are provided with openings through which bolts 79 pass and secure the angles 77 to the forward frame members 16 already described—as illustrated in Fig. 5.

In describing the invention, we have described the placing of fertilizer and water adjacent to the plantings or plant roots. It is to be understood that this is to be construed as meaning close enough to properly function and feed the planting.

In order to shut off the water-feeding mechanism without affecting its adjustment, there is provided, on the slide 54 a pivot 75ᵃ, upon which is pivoted a link 76ᵃ, the other end of which is pivoted at 77ᵃ to the rod 50ᵃ. A stop 78ᵃ on the side of the slide 54 supports the end of the rod 50ᵃ. When it is desired to stop operation of the water-supply device, the knob 73ᵃ (Fig. 10) is turned anticlockwise. This prevents the offset portion 50ᶜ from lifting the end portion 59ᵇ to open the water valve.

In order to raise and lower the transplanting machine, there is provided a lever 60 which is pivoted on a shaft 61 in the main frame. This lever has a quadrant 62 with suitable notches engaged by a detent which is operated by a grip 60ᵃ, in a well known manner. On the shaft 61 is mounted a lever arm 63 to the outer end of which is connected a spring-link means 64. At the lower end of the spring-link means is a pivot 64ᵃ which connects to the forward frame 16 to lift the forward end of this frame 16 and the dry fertilizer depositing device.

A link 65 is pivoted to the lever 60 and extends rearwardly to a bell crank 66 to which it is pivotally connected. This bell crank 66 is mounted on a bell crank shaft 67 having an arm 68. At the outer end of this arm 68, is connected a spring link means 69, at the lower end of which is a pivotal connection 70ᵃ to the rear of the frame 14.

It will be observed that by the operation of the lever 60, the whole under frame construction with the dry fertilizer depositing, water depositing and transplanter mechanisms may be raised or lowered at the will of the operator.

Figures 4, 11, 12:
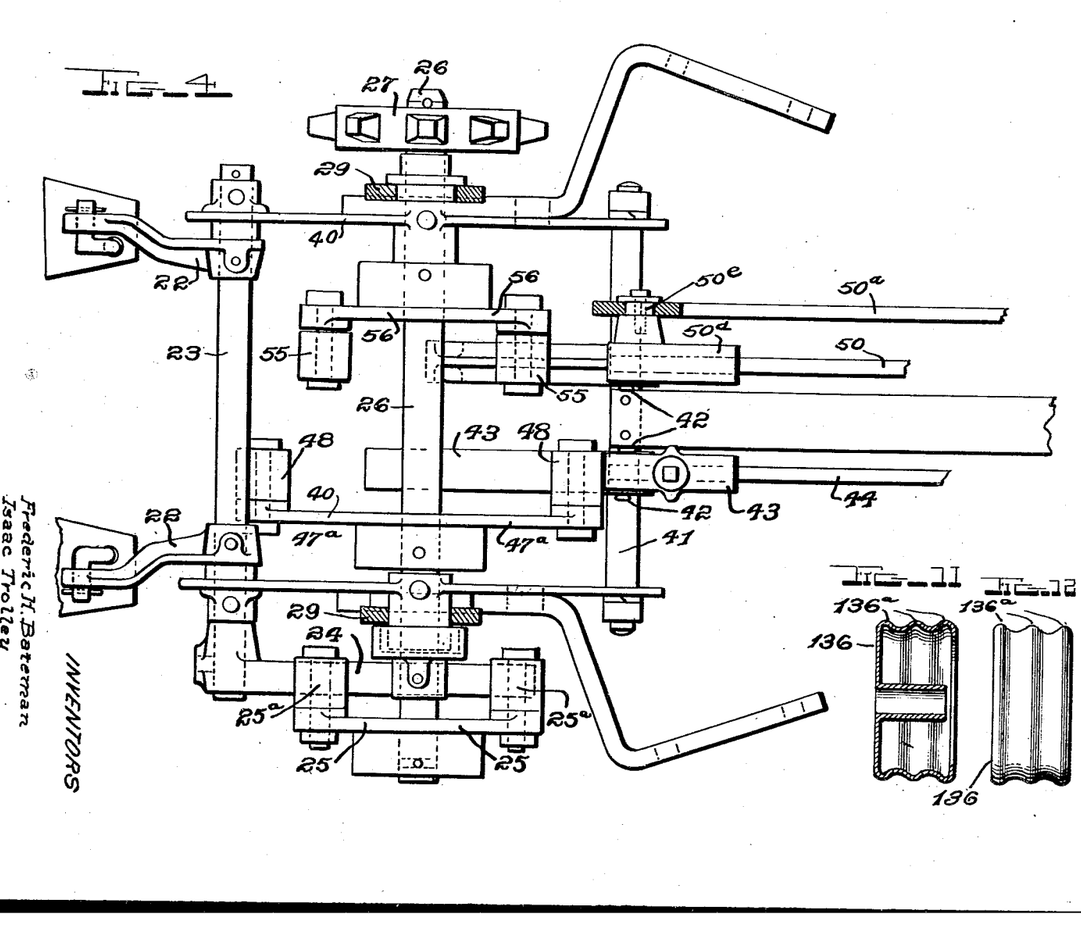
Fig. 4 is a plan view of some of the important operating parts.
Figs. 11 and 12 are detail views of a modified presser wheel.
Figure 5:
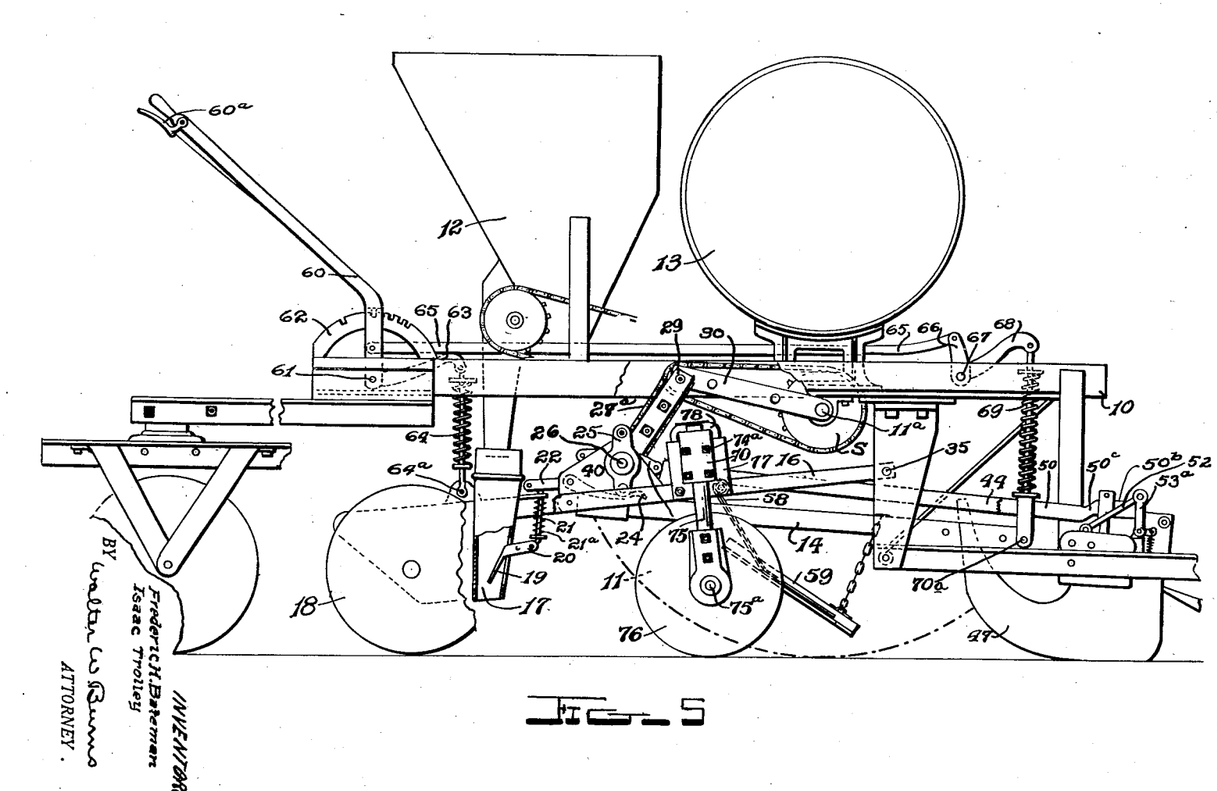
Fig. 5 is an elevational sectional view showing parts removed and other parts broken away for clearness.

As an alternative structure for the press wheels 36, we may provide a wheel as shown in Figs. 11 and 12. The wheel 136 is provided with a non-cylindrical surface as the fluted surface 136ᵃ. When such a wheel is used, there is a tendency toward the more thorough crushing of the lumps of soil, thus assisting in the proper pressing of the latter around the plant roots. In addition, it has been found that the corrugations tend to prevent soil errosion and hold rain water until absorbed by the soil.

As an alternative structure and to provide vertical adjustment for the transplanter and water depositing mechanisms independently of the dry fertilizer depositing mechanisms, we provide a swinging bell-crank-quadrant 166 with pivotal connection to the shaft 167. Pivoted also on the shaft 167 is the arm 168 which has a lever handle extension 168ᵃ with a grip-detent device 168ᵇ for coactive engagement with the notches 166ᵃ of the quadrant 166.

It will thus be clear that by manipulation of the lever 168 by its extension 168ᵃ, the rear end of the frame 14 can be raised or lowered at will by the operative at the rear of the planter.

The water either coming into contact with the dry fertilizer or with the fertilizer in solution or in suspension, makes the fertilizer available for the immediate use of the plant.

While we have illustrated and described in detail an embodiment of our invention, it is to be understood that the disclosure is merely illustrative and that modifications and changes may be made without departing from the spirit of the invention and within the scope of the appended claims.

Having described our invention, what we claim is:

1. A transplanting machine comprising a movable plant gauge, a water supply means, a ground opening means and a coacting dry fertilizer supply means forward of the gauge and at the rear of the rear of the ground opening means and drive means to move the gauge and open the water and dry fertilizer supply means to place the water and fertilizer in units adjacent positions of the plant roots and means for covering the plant roots with earth.

2. A transplanting machine comprising a longitudinally reciprocating gauge, a water supply means, a ground opening means and a coacting dry fertilizer supply means forward of the gauge and at the rear of the rear of the ground opening means and drive means to move the gauge and open the water and dry fertilizer supply means to place the fertilizer and water in units, portions of which are below the positions of parts of the plant roots and means for covering the plant roots with earth.

3. A transplanting machine comprising a movable plant gauge, a water supply means, a ground opening means and a coacting dry fertilizer supply means forward of the gauge and at the rear of the rear of the ground opening means, a rotary cam means, and connecting means from the cam means to operate the water supply means and dry fertilizer supply means to place units of fertilizer and water adjacent the plant roots and means for covering the plant roots with earth.

4. A transplanting machine comprising a gauge mounted for longitudinal movement along the ground and substantially at the speed of travel in one direction, means for opening the ground and coacting means for depositing dry fertilizer units in the ground at the rear of the ground opening means, water supply means and means for coordinating the gauge and supply means to place dry fertilizer in the ground only adjacent the position of transplanting and means for covering the plant roots with earth.

5. A transplanting machine comprising a planting gauge, a water supply means, a ground opening means and a coacting dry fertilizer supply means forward of the gauge and at the rear of the rear of the ground opening means and coordinated power means operatively connected to the gauge and to open the water and dry fertilizer supply means to place the fertilizer in units adjacent the plant roots, means for covering the plant roots with earth and means for independently controlling the depths of the dry fertilizer and water deposits and of the planting gauge as it passes over the ground.

6. A transplanting machine comprising a movable plant gauge, a water supply means, a ground opening means and a coacting dry fertilizer supply means forward of the gauge and at the rear of the rear of the ground opening means and drive means deriving its power from the forward movement of the machine to move the gauge and open the water and dry fertilizer supply means to place the water and fertilizer in units adjacent the plant roots, and means for covering the plant roots with earth.

7. A transplanting machine comprising a longitudinally reciprocating plant gauge, a water supply means, a ground opening means and a coacting dry fertilizer supply means forward of the gauge and at the rear of the rear of the ground opening means, and drive means operatively connected to a wheel of the machine to move the gauge and open the water and dry fertilizer supply means to place the fertilizer and water in units below the plant roots and means for covering the plant roots with earth.

8. A transplanting machine comprising a movable plant gauge, a water supply means, a ground opening means and a coacting dry fertilizer supply means forward of the gauge and at the rear of the rear of the ground opening means, a rotary cam-coacting means, power means to drive the rotary cam-coacting means from the ground wheels and connecting means from the cam-coacting means to operate the water supply means and dry fertilizer supply means, to place units of fertilizer and water adjacent the plant roots and means for covering the plant roots with earth.

9. A transplanting machine comprising a movable gauge mounted for longitudinal movement adjacent the ground level, means for opening the ground and a dry fertilizer supply means coacting therewith and in the rear thereof, a water supply means, a rotary cam-coacting member, connections between the rotary cam-coacting member and the dry fertilizer and water supply means to operate them from the cam-coacting member to place units of fertilizer and water adjacent the plant roots, means for covering the plant roots with earth, and power means for the cam-coacting member and deriving its power from the forward movement of the machine and having power connections to the rotary cam-coacting member.

10. A transplanting machine comprising a gauge mounted for longitudinal movement along the ground and at the speed of travel in one direction, means for opening the ground and coacting means for depositing dry fertilizer units in the ground at the rear of the ground opening means, water supply means and means for co-ordinating the gauge and supply means to place dry fertilizer and water in the ground only adjacent the position of transplanting, means for covering the plant roots with earth, and means, including a ground engaging member having power connections to the fertilizer and water supply means.

11. A transplanting machine comprising a movable planting gauge deriving its power to move from the forward movement of the machine, the gauge being movable in one direction at substantially the speed of travel movement, a ground opener and coacting fertilizer supply means adjacent and at the rear of the ground opener, water supply means, means for operating the fertilizer and water supply means to deliver fertilizer and water in spaced units in the ground, the transplanter gauge having longitudinally movable coordinating means to move the gauge to indicate time of release of the planting, earth smoothing means between the fertilizer supply means and the gauge, ground opening means for the gauge and means for covering the plant roots with earth.

12. A transplanting machine comprising a movable gauge mounted for longitudinal movement adjacent the ground level, means for opening the ground and a dry fertilizer supply means coacting therewith and for depositing fertilizer therebehind, a water supply means, a rotary cam-coacting member, connections between the rotary cam-coacting member and the dry fertilizer and water supply means to operate them from the cam-coacting member to place broken bands of fertilizer and water adjacent the plant roots, means for covering the plant roots with earth.

13. A transplanting machine comprising a planting gauge mounted for longitudinal movement along the ground and at substantially the speed of travel in one direction, means for opening the ground and means for depositing dry fertilizer units in the ground and at the rear of the ground opening means, water supply means and means for co-ordinating the gauge and supply means to place dry fertilizer in broken bands and water in the ground, only adjacent the position of transplanting, means for covering the plant roots with earth.

14. A transplanting machine comprising a planting gauge, the gauge being movable in one direction at substantially the speed of travel movement, a ground opener and fertilizer supply means adjacent and at the rear of the ground opener, water supply means, means for operating the fertilizer and water supply means to deliver the water in units and the fertilizer in broken bands in the ground and adjacent the planting, the transplanter gauge having longitudinally movable coordinating means to move the gauge to indicate time of release of the planting, earth smoothing means between the fertilizer supply means and the gauge, ground opening means for the gauge and means for covering the plant roots with earth.

15. A transplanter machine comprising a movable plant gauge, a water supply means, a ground opening means and a coacting dry fertilizer supply means for depositing fertilizer behind the ground opening means and drive means operatively connected to a wheel of the machine to move the gauge and open the water and dry fertilizer supply means to place the water in units and the fertilizer in broken bands adjacent the plant roots, means for covering the plant roots with earth and means for independently controlling the depths of the dry fertilizer and water deposits and of the planting guide as it passes over the ground.

16. A planting machine comprising a planting interval means, a water supply means, a ground opening means and a coacting dry fertilizer supply means forward of the gauge and at the rear of the rear of the ground opening means and drive means to operate the planting interval means and open the water and dry fertilizer supply means to place the water and fertilizer in units adjacent the plantings and means for covering the plantings with earth.

17. A planting machine comprising a planting interval means mounted for longitudinal movement adjacent the ground level, means for opening the ground and a dry fertilizer means coacting therewith and for depositing fertilizer therebehind, a water supply means, a rotary cam-coacting member, connections between the rotary cam-coacting member and the dry fertilizer and water supply means to operate them from the cam-coacting member to place units of fertilizer and water adjacent the plantings and means for covering the plantings with earth.

18. A planting machine comprising a planting interval means, a water supply means, a ground opening means and a coacting dry fertilizer supply means for depositing fertilizer behind the ground opening means and drive means to move the planting interval means and open the water and dry fertilizer supply means to place the water adjacent the root positions and to place the fertilizer in broken bands adjacent the plantings and means for covering the positions of the plant roots with earth.

19. A planting machine comprising a planting interval means, a water supply means and a ground opening means, a dry fertilizer supply means coacting therewith and for depositing fertilizer behind the ground opening means, a rotary cam-coacting means, connecting means from the cam-coacting means to operate the water supply means and dry fertilizer supply means, to place broken bands of fertilizer, and water adjacent the positions of the plant roots and means for covering the plantings with earth.

20. A planting machine comprising a water supply means and opening means therefor and a planting interval means, means for coactively operating the planting interval means and the water supply opening means to place water adjacent the root positions of the plantings and manually operated means operable at the will of the operator for rendering the water supply opening means temporarily inoperative while still retaining its adjustment.

21. A transplanting machine comprising a movable plant gauge, a fertilizer supply delivery means, means forward of the delivery means for opening the ground for the deposit of the fertilizer, bedding means at the rear of the fertilizer depositing means and means for reciprocating the plant gauge.

22. A transplanting machine comprising a movable plant gauge, a fertilizer supply delivery means, means forward of the delivery means for opening the ground for the deposit of the fertilizer, bedding means at the rear of the fertilizer depositing means, leveling means to smooth the surface of the soil in the rear of the fertilizer means and bedding means, and means for reciprocating the plant gauge.

23. A transplanting machine comprising a fertilizer supply delivery means, means forward of the delivery means for opening the ground for the deposit of the fertilizer, leveling means at the rear of the fertilizer depositing means to smooth the surface of the soil, a second ground opening means in rear of the leveling means, a movable plant gauge in rear of the leveling means and means for reciprocating the plant gauge.

24. A transplanting machine comprising a dry fertilizer supply delivery means, means forward of the delivery means for opening the ground for the deposit of the fertilizer, leveling means at the rear of the fertilizer depositing means to smooth the surface of the soil, a plant gauge, means for reciprocating the plant gauge, a liquid fertilizer supply means for supplying liquid fertilizer adjacent the plant gauge and means coacting with the plant gauge to open and close the liquid fertilizer supply means.

25. A transplanting machine comprising a fertilizer supply delivery means, means forward of the delivery means for opening the ground for the deposit of the fertilizer, bedding means at the rear of the fertilizer depositing means, a second ground opening means in rear of the bedding means, a movable plant gauge in rear of the bedding means and means for reciprocating the plant gauge.

26. A transplanting machine comprising a dry fertilizer supply delivery means, means forward of the delivery means for opening the ground for the deposit of the fertilizer, bedding means at the rear of the fertilizer depositing means, a plant gauge, means for reciprocating the plant gauge, a liquid fertilizer supply means for supplying liquid fertilizer adjacent the plant gauge and means coacting with the plant gauge to open and close the liquid fertilizer supply means.

FREDERIC H. BATEMAN.
ISAAC TROLLEY.